United States Patent
Li et al.

(10) Patent No.: US 7,405,178 B2
(45) Date of Patent: Jul. 29, 2008

(54) CATALYSTS FOR MANUFACTURING CARBON SUBSTANCES

(75) Inventors: Xu Li, Osaka (JP); Youchang Wang, Osaka (JP); Takashi Okawa, Osaka (JP); Akio Harada, Osaka (JP); Yoshikazu Nakayama, 9-404, 14-2, Korigaoka 1-chome, Hirakata-city, Osaka (JP) 573-0084

(73) Assignees: Daiken Chemical Co., Ltd., Osaka (JP); Yoshikazu Nakayama, Osaka (JP)

( * ) Notice: Subject to any disclaimer, the term of this patent is extended or adjusted under 35 U.S.C. 154(b) by 0 days.

(21) Appl. No.: 10/328,105

(22) Filed: Dec. 23, 2002

(65) Prior Publication Data
US 2008/0153693 A1   Jun. 26, 2008

(30) Foreign Application Priority Data
Dec. 28, 2001   (JP)   .............................. 2001-403233

(51) Int. Cl.
B01J 23/58   (2006.01)
(52) U.S. Cl. .................. 502/325; 502/332; 502/335; 502/337
(58) Field of Classification Search ................. 502/325, 502/332, 337, 338, 335, 336
See application file for complete search history.

(56) References Cited

U.S. PATENT DOCUMENTS

| | | | | |
|---|---|---|---|---|
| 1,487,133 A | * | 3/1924 | Alexander .................. 420/129 |
| 3,691,102 A | * | 9/1972 | Swift ........................ 502/218 |
| 4,366,091 A | * | 12/1982 | Antos ........................ 502/310 |
| 4,380,673 A | * | 4/1983 | Bournonville et al. ....... 568/361 |
| 4,628,130 A | * | 12/1986 | Bournonville et al. ....... 568/885 |
| 5,095,161 A | * | 3/1992 | Abrevaya et al. ............ 585/500 |
| 5,169,612 A | * | 12/1992 | Nielsen ..................... 423/230 |
| 5,356,851 A | * | 10/1994 | Sarrazin et al. ............. 502/185 |
| 5,698,715 A | * | 12/1997 | Schroeder et al. ........... 549/346 |
| 5,759,939 A | * | 6/1998 | Klabunde et al. ........... 502/328 |
| 6,063,939 A | * | 5/2000 | Groning et al. ............. 549/356 |
| 6,274,532 B1 | * | 8/2001 | Herda et al. ................ 502/314 |
| 6,309,758 B1 | * | 10/2001 | Schmidt ..................... 428/570 |
| 6,558,645 B2 | * | 5/2003 | Nakayama et al. ...... 423/445 B |
| 6,583,085 B1 | * | 6/2003 | Nakayama et al. .......... 502/332 |
| 6,735,046 B2 | * | 5/2004 | Nakayama et al. .......... 360/110 |
| 2001/0019374 A1 | * | 9/2001 | Izumi et al. .................. 349/43 |
| 2003/0010279 A1 | * | 1/2003 | Nakayama et al. ............ 117/84 |
| 2003/0012721 A1 | * | 1/2003 | Nakayama et al. ....... 423/447.3 |
| 2003/0109382 A1 | * | 6/2003 | Nakayama et al. .......... 502/336 |

* cited by examiner

*Primary Examiner*—Steven Bos
(74) *Attorney, Agent, or Firm*—William L. Androlia; H. Henry Koda

(57) ABSTRACT

A catalyst for manufacturing carbon substances, such as carbon nanotube that has a diameter of 1000 nm or less, the catalyst containing at least iron, cobalt or nickel of a first element group and tin or indium of a second element group. The catalyst can be formed by at least tin and indium in addition to cobalt or nickel. The former catalyst provides a 2-component type catalyst and a multi-component type catalyst that is composed on the basis of the 2-component type catalyst, and the later catalyst provides a 3-component type catalyst and a multi-component type catalyst that is composed on the basis of the 3-component type catalyst.

1 Claim, 16 Drawing Sheets

$Fe_2O_3 \cdot Sn$ $Fe_2O_3 \cdot In$

Co・Sn

Co · In

CoO · Sn

CoO · In

Ni · Sn

Ni · In

NiO · Sn

NiO · In

Fe$_2$O$_3$ ·ITO

Co・ITO

NiO · ITO

CATALYSTS FOR MANUFACTURING CARBON SUBSTANCES

BACKGROUND OF THE INVENTION

1. Field of the Invention

The present invention relates to catalysts for manufacturing carbon substances which are carbon nanocoils having an external diameter of 1000 nm or less, or carbon nanotubes having a sectional diameter of nanosize, etc. More specifically, the present invention relates to the catalysts for manufacturing carbon substances which effectively cause the carbon substances to grow on the surface of the catalysts while a raw-material gas is under pyrolysis by means of a catalyst which contains at least more than two components, that is, which contains at least both a first element group including iron, cobalt and nickel and a second element group including tin and indium.

2. Prior Art

Diamond and graphite have been known as substances made from carbon (hereafter called "carbon substance"). The crystal structure of a diamond is stereo-structure and the crystal structure of the graphite is a two dimensional layer-structure. The utility of these two carbon substances is extremely limited due to the difficulty of technical treatment for them.

In order to utilize the heat resisting property and the strength of carbon, a research and development of carbon filament started actively in 1960. By weaving carbon filaments to form a woven sheet, and further by combining the woven sheet and resin to make a compound fiber, a compound fiber can be utilized in a wide region.

Since the method of manufacturing carbon filaments was established in the decade of 1980, it is succeeded to give car bodies lightness and strength by means of making car bodies from the carbon filaments. Furthermore, golf equipment and fishing rods which are formed with compound fibers have been brought into practical use. Thus many kinds of carbon goods have been used.

There are two methods for manufacturing carbon filaments, one is to remove the organic substance by means of calcinating organic fibers such as acrylic fiber, etc, another is a vapor-phase catalytic decomposition method in which the growth of carbon filaments is stimulated by means of decomposing hydrocarbon in gas phase by using catalytic particles.

Specifically, in the vapor-phase catalytic decomposition method, the fine powder of ferromagnetic metal such as Fe, Ni and Co is used. In this method the carbon filament is grown at the tip-end on which this catalytic powder adheres, while pyrolizing hydrocarbon at the tip end portion. Besides, a method that uses the catalytic powder of Fe.Co alloy is developed. However, most of the carbon filaments which are manufactured in these methods are curved in the middle portion, and it was difficult to grow carbon filaments with high linearity.

In such a situation, a discovery of fullerene was reported in the *Nature* magazine, Vol. 318 (1985) 162, by H. W. Kroto, J. R. Heath, S. C. O'Brien, R. F. Curl, and R. E. Smalley, which is expressed by $C_{60}$ and a carbon molecule of a soccer ball shape. This fullerene is a new type of the carbon substances. Nest, S. Iijima reported in 1991, in the *Nature* magazine; Vol. 354 (1991) 56-58 that he succeeded in the synthesis of a carbon nanotube with high linearity by means of an arc discharge method. The characteristic point of his method was to find carbon filaments with very high linearity in carbon substances heaped up on the cathode, which were produced by the ordinary arc discharge without using any catalyst. He named helical micronanotube the carbon filament, but at present, it is called a carbon nanotube.

Though the use of fullerene is not so much, the development for use of the carbon nanotube has been rapidly extended. In this circumstance, a carbon nanocoil, in addition, was discovered as a further new carbon substance. The carbon nanocoil was discovered in the process of researching carbon microcoil.

The fact that carbon fibers grow in a vapor phase, while being twisted in the manner of a rope, was first reported by Davis et al. (W. R. Davis, R. J. Slawson and GR. Rigby, *Nature*, Vol. 171, 756 (1953)). Since the external diameter of such carbon ropes is micro-size, such ropes are ordinarily referred to as carbon microcoils. Subsequently, various reports appeared concerning carbon nanocoils: however, since there was strong element of randomness involved in the production of such coils, the coils lacked reproducibility, and reminded in a state that was inadequate for industrial production.

In 1990, Motojima et al. (S. Motojima, M. Kawaguchi, K. Nozaki, and H. Iwanaga, *Appl. Phys. Lett.*, 56 (1990) 321) discovered an efficient method for manufacturing carbon microcoils, and as a result of subsequent research, they established a manufacturing method that showed reproducibility. In this method, a graphite substrate which is coated with a powdered Ni catalyst is placed inside a horizontal type externally heated reaction tube made of transparent quartz, and a raw-material gas is introduced perpendicularly onto the surface of the substrate from a raw-material gas introduction part located in the upper part of the reaction tube. This raw-material gas is a mixed gas of acetylene, hydrogen, nitrogen and thiophene. The exhausted gas is discharged from the bottom part of the reaction tube.

In this manufacturing method, impurities such as sulfur and phosphorous, etc., are indispensable; and if the amounts of these impurities are too large or too small, carbon microcoils will not grow. For example, the coil yield reaches maximum, at a value of approximately 50%, in a case where thiophene-containing sulfur is added at the rate of 0.24% relative to the total gas flow. The reaction temperature is approximately 750 to 800° C.

Diameter of fibers constituting such carbon microcoils is 0.01 to 1 μm, the external diameter (outside diameter) of the coil is 1 to 10 μm, the coil pitch is 0.01 to 1 μm, and the coil length is 0.1 to 25 mm. It is characteristic that these carbon microcoils are of micro-size and have an amorphous structure. In another ward, the carbon microcoils are substances that amorphous fibers grow up in a coil shape without a hole.

In 1991, carbon nanocoils were discovered. Spurred by this discovery, research concerning carbon coils on the nanometer scale, i.e., carbon nanocoils was initiated. The reason for this was that on the nanometer scale, there was a possibility that a new physical property might be discovered, so that such nanocoils showed promise as new materials in electronics and engineering, etc., in nanometer region.

In 1994, Amelinckx et al. (Amelinckx, X. B. Zhang, D. Bernerts, X. F. Zhang, V. Ivanov and J. B. Nagy, *Science*, 265 (1994) 653) succeeded in producing carbon nanocoils. It was also demonstrated that while carbon microcoils are amorphous, carbon nanocoils have a graphite structure. Various types of carbon nanocoils were manufactured, and the minimum external diameter of these nanocoils was extremely small, i.e., approximately 12 nm.

The manufacturing method used by the above mentioned researchers was a method in which a metal catalyst such as Co, Fe or Ni is formed into a fine powder, the area around this catalyst is heated to a temperature of 600 to 700° C., and an organic gas such as acetylene or benzene is caused to flow through so that this gas contacts the catalyst, thus breaking down these organic molecules. The substance produced as a result consists of carbon nanotubes with a graphite structure, and the shapes of these nanotubes are linear, curvilinear, planar spiral and coil form, etc.

In 1999, Li et al. (W. Li, S. Xie, W. Liu, R. Zhao, Y. Zhang, W. Zhou, and G. Wang; *J. Material Sci.*, 34 (1999) 2745) succeeded again in producing carbon nanocoils. In the manufacturing method used by these researchers, a catalyst formed by covering the outer circumference of a graphite sheet with iron particles was placed in the center, and the area around this catalyst was heated to 700° C. by means of a nichrome wire. This catalyst is a 2-component type catalyst consisting of graphite and iron. However, as the carbon nanocoils are carbon substance, the graphite is used as a basic material, so that this catalyst can be regarded as a 1-component Fe catalyst combined with graphite. This manufacturing method also showed a small coil production rate and was extremely inadequate as an industrial production method.

As described above, the catalysts for manufacturing carbon filaments and carbon nanocoil are limited to a one component type catalyst for which ferromagnetic metal such as Fe, Co or Ni is used as simple substance, to a two component type catalyst which is an alloy consisting of two ferromagnetic metals such as Fe.Co, or to a two component catalyst combining ferromagnetic metal and graphite.

In the course of analyzing such a conventional catalyst, the present inventors investigated a possibility of two and three component type catalyst and multi (more than three) component type catalysts which are constructed by adding non-ferromagnetic metals to the ferromagnetic metal such as Fe, Co, or Ni. As a result, the inventors reached to the invention which was published in Japanese Patent Application Laid-Open (Kokai) No. 2002-192204. This invention disclosed a 3-component type catalyst comprising indium, tin and iron.

In more concrete terms, the 3-component type catalyst is formed by vacuum-evaporating an iron thin film on the surface of an ITO substrate which is a thin film being mixture of indium-oxide and tin-oxide. ITO is an abbreviation of Indium-Tin-Oxide. The ITO substrate is widely used as a raw material of semi-transparent electrodes in the field of semi-conductor. It was found in a study that, when hydrocarbon gas is pyrolyzed in a reaction apparatus, a large amount of carbon nanocoils grow on the surface of the 3-component type catalyst.

The study shows that there is a possibility of synthesis of a large amount of carbon substances such as carbon nanotubes or carbon nanocoils by using adequate catalysts. There, however, might still exist unknown catalysts. Therefore, it would be very significant to consider again the construction of catalysts.

SUMMARY OF THE INVENTION

Accordingly, the object of the present invention is to provide a catalyst that can produce different types of carbon substances with various structures, by developing a 2-component type catalyst constructed by adding a non-ferromagnetic metal to a ferromagnetic metal such as Fe, Co or Ni, and by developing a multi-component type catalyst constructed by adding further other components to the 2-component type catalyst.

More specifically, the present invention provides a catalyst for manufacturing carbon substances which is characterized in that the catalyst contains at least one of first element and one of second element wherein the first element comprises iron, cobalt nickel and the second element comprises tin and indium.

The present invention provides a catalyst for manufacturing carbon substances wherein the catalyst contains at least tin and either iron or cobalt, and this catalyst is used for manufacturing carbon substances which are carbon nanocoils, the diameter of the nanocoils being equal to or less than 1,000 nm.

The present invention provides a catalyst for manufacturing carbon substances wherein the catalyst contains at least nickel and indium, and this catalyst is used for manufacturing carbon substances that are carbon nanocoils, the diameter of the nanocoils being equal to or less than 1,000 nm.

The present invention provides a catalyst for manufacturing carbon substances which is characterized in that the catalyst contains at least both tin and indium in addition to cobalt or nickel.

In the present invention that provides a catalyst for manufacturing carbon substances, the above-mentioned iron, cobalt and nickel can be iron-oxide, cobalt-oxide and nickel-oxide, respectively.

Furthermore, in the present invention that provides a catalyst for manufacturing carbon substances, the above-mentioned tin and indium can be in the form of an ITO film (indium-tin-oxide film), respectively.

BRIEF DESCRIPTION OF THE DRAWINGS

FIG. 5 is an electron microscope image of carbon substances grown by the catalyst Co.In;

FIG. 7 is an electron microscope image of carbon substances grown by the catalyst CoO.In;

FIG. 9 is an electron microscope image of carbon substances grown by the catalyst Ni.In;

FIG. 11 is an electron microscope image of carbon substances grown by the catalyst NiO.In;

FIG. 13 is a distribution graph of the external diameter of carbon nanocoils grown by the catalyst Ni.In;

DETAILED DESCRIPTION OF THE INVENTION

Figure 1:
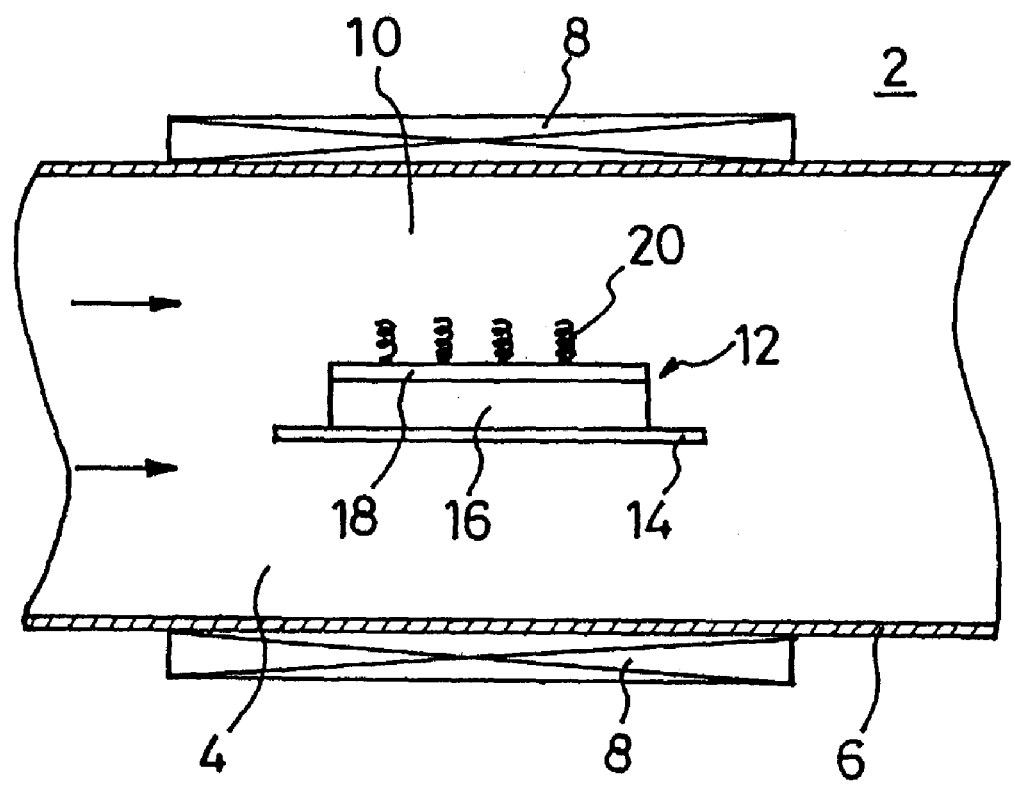
FIG. 1 is a schematic structural diagram of a carbon substance manufacturing apparatus of the present invention.

The present inventors, as a result of diligent research concerning 2-component type catalysts and multicomponent type catalysts for manufacturing carbon substances, reached to the conclusion that carbon substances produced by the catalysts are classified mainly into carbon nanocoils (called "CNC" below), carbon nanotubes (called "CNT" below) and carbon nanoparticles (called "CNP" below).

Here, the CNC is a carbon substance formed in a helical configuration (coil form) with a regular rotation period, the CNT is a carbon substance formed in a fiber configuration and the CNP is a carbon substance formed in a particle shape. In particular, the CNTs comprise not only a linear (not curved) carbon substance, but also carbon substances of an irregularly curved fiber and/or of an irregular helical form.

The carbon substance produced by the method of the present invention may be called nano-carbon-substance, since the size is nanoscale. Concretely saying, the CNC means a small carbon coil which has an external diameter of the cross section equal to or less than 1,000 nm, the CNT means a carbon nanotube which has a diameter of the tube cross section of 1 to several 100 s nm, and the CNP means a small carbon particle with a diameter equal to or less than 1,000 nm.

In observation by an electron microscope, carbon substances appearing in a range of vision are ordinarily expressed as CNC, CNT and CNP. Since a CNC is often mixing with a CNT, the expression CNC (large)+CNT means the state that a small quantity of CNT mixes with a large quantity of CNC, and the expression CNC (small)+CNT means a state that a large quantity of CNT exists, mixing with a small quantity of CNC. When simply written as CNT or CNP, it means that only the same carbon substance exists in a range of vision.

Though a catalyst by which only the CNT is produced is a catalyst for manufacturing CNT, a catalyst by which CNC+CNT are produced work not only as the catalyst for manufacturing CNC, but also as the catalyst for manufacturing CNT. In a case where a single catalyst produces a mixing state of CNC and CNT, the technique to divide the CNC and the CNT is necessary. Needless to say, the catalyst by which only a CNC is produced is used as the catalyst for manufacturing CNC. It is same for the catalyst for manufacturing CNT.

The two component type catalysts related to the present invention contain at least any one of iron, cobalt or nickel of the first element group and any one of tin or indium of the second element group. Accordingly, there exist six kinds of the 2-component type catalysts related to the present invention, and those are expressed by the element symbol as Fe.Sn, Fe.In, Co.Sn, Co.In, Ni.Sn, and Ni.In.

The 2-component type catalysts were discovered on the basis of the next two facts. Namely, the first is the fact that in order to manufacture CNC, Amelinckx et al. discovered a 1-component type catalyst by, which consists of iron, cobalt or nickel, and also that the one component type catalyst of iron, cobalt or nickel is used even in the case of producing carbon filaments. The second is the discovery of the 3-component type catalysts comprising indium, tin and iron, by the present inventors.

By the formers, ferromagnetic metals such as iron, cobalt and nickel have been used for necessary components to synthesize CNC or CNT. By the later, it is shown that a large quantity of CNC is synthesized by the indium-tin-iron type catalyst, if indium and tin are added to the ferromagnetic metal iron.

The idea of the present inventors is based on a verification of which of indium and tin more contributes to the growth of CNC. In order to verify it, the researchers of the present invention tried experiments synthesizing carbon substances by constructing 2-component type catalysts of iron-indium and iron-tin. As a result of the experiment, it was founded that the iron-tin catalyst caused CNC to grow intensively, while the iron-indium catalyst caused almost only CNP to grow.

Similar synthesis experiments were performed for catalysts of other ferromagnetic metals such as cobalt and nickel. Though a cobalt-nickel catalyst caused both a CNC and a CNT to synthesize, a cobalt-indium catalyst caused almost only CNT to synthesize. On the contrary, a nickel-tin catalyst caused almost only CNT to synthesize, while a nickel-indium catalyst caused to synthesize both a CNC and CNT.

Accordingly, since Fe.Sn, Co.Sn and Ni.In, expressed in term of the element symbol, cause to synthesize CNC+CNT, these act as the catalysts for manufacturing CNC and CNT. When the yield of CNC is improved to be more than 90%, CNC is obtained almost as simple substance, but if the yield of CNC is reduced, the technique to collect by separating the CNC from the CNT is necessary. On the other hand, it was founded that Fe.In was available for the catalyst for manufacturing CNP, and Co.In and Ni.Sn were available for the catalysts for manufacturing CNT.

From the results above, it was found that when manufacturing CNC, iron, cobalt and nickel strongly depend on the selection of tin or indium. However, the reason why the ferromagnetic metal is available for the catalyst and has a strong selection tendency for their combinations is unknown at present.

The next problem is to make it clear whether or not the 2-component type catalysts, to which third components added, are available for the catalyst. In order t solve the problem, a synthesis experiment of carbon substances was executed using ITO (Indium-Tin-Oxide) substrates added ferromagnetic metals. As above-mentioned, this ITO is a mixture of indium-oxide and tin-oxide.

As a result, it was found that all of the iron ITO, cobalt ITO and nickel ITO synthesize carbon nanocoils at a high yield rate. Since metal components ordinarily work as catalyst, these 3-component type catalysts are expressed as Fe.In.SN, Co.In.Sn and Ni.In.Sn in terms of the element symbol. As described above, the 3-component type catalyst of Fe.In.Sn has been disclosed by the present inventors.

Fe.In.Sn obviously contains at least Fe.Sn. Similarly, Co.In.Sn contains at least Co.Sn, and Ni.In.Sn contains at least Ni.In. These facts show that even the 2-component type catalyst, to which another element is added, can be used as a catalyst for manufacturing CNC.

Saying straightforwardly, it means that if the above-mentioned 2-component type catalyst is available for the catalyst for manufacturing CNC, a multi-component type catalyst which is constructed by adding other element to the 2-component type catalyst also work well as a catalyst for manufacturing CNC. Furthermore, the 3-component type catalyst of Fe.In.Sn has a tendency to produce the yield of CNC more than the 2-component type catalyst, but the detail of the reason is unclear at present.

Next, both cases of catalysts constructed with pure metals and with metal oxides were examined. More specifically, as a result of the experiment examination, in the respective cases of Fe.Sn, Co.Sn, and Ni.In, whether the effects as the 2-component type catalysts of for manufacturing CNC are different or not, depending on chemical states of metal elements contained in the catalysts, it was found that both a pure metal state and a metal-oxide state are available for a catalyst.

For example, in the case of Fe.Sn, a catalyst of the vacuum-evaporated Fe film piled on the vacuum-evaporated Sn film is effective and an alloy calcinating the mixture of an Fe fine powder and an Sn fine powder is also effective. Furthermore, a catalyst calcinating the mixture of a $Fe_2O_3$ powder and $SnO_2$ powder, and also a catalyst calcinating the mixture of an $Fe_2O_3$ powder and an Sn powder are effective. From these facts, it is inferred that the co-existence state of an Fe-atom and an Sn-atom contributes to the growth of CNC. This is similar for the catalysts of Co.Sn and Ni.In.

It was confirmed that also in 3-component type catalysts, both cases where the constituting element is a pure metal and a metal-oxide are effective as the catalyst for manufacturing CNC. That is, an ITO substrate is a thin film mixed of $In_2O_3$ with $SnO_2$, and the ITO substrate on which a vacuum evaporated iron film is formed turns into a strong catalyst. This fact has been already published in the above-mentioned open laid publication.

It was also confirmed that the thin film made of a mixing powder of $Fe_2O_3$, $In_2O_3$ and $SnO_2$, and the thin film of an In and Sn alloy on which a vacuum-evaporated Fe film is formed, are likewise effective as the catalyst. Accordingly, it can be regarded that a substance that contains at least Fe-atoms and Sn-atoms works as a catalyst for manufacturing CNC, even in cases where In-atoms and further other atoms are added to it. This fact is also true at least for a multi-component type catalyst containing Co-atoms and Sn-atoms, and also a multi-component type catalyst containing Ni-atoms and In-atoms.

Even organic-metallic compounds containing organic-metallic complexes as a metallic-source material are effective as the catalysts for manufacturing carbon substances. For example, in the case of a 2-component type catalyst of Fe.Sn, a thin film of a mixture of an organic-iron compound and an organic-tin compound is formed on the surface of a substrate, and next the film is broken down to remove organic components therefrom by means of calcination method, thus obtaining a thin film of the mixture of iron and tin. By calcination in the air, Fe and Sn are oxidized and turned into $Fe_2O_3$ and $SnO_2$. The Fe.Sn catalyst thus produced works well as the catalyst for manufacturing carbon nanocoils. It is same for another 2-component type catalysts. Furthermore, from an organic-iron compound and an organic-cobalt compound, a mixing catalyst of $Fe_2O_3$ and CoO is formed by calcination method in the air.

Organic-metallic compounds containing organic-metallic complexes may be used as raw materials in the composition of 3-component type catalysts. For example, in the composition of 3-component type catalysts consisting of Fe.Sn.In, a thin film is formed on the surface of a substrate, using the mixture of an organic-iron compound, an organic-tin compound and an organic-indium compound. By calcinating the substrate and by breaking down to remove all organic components from the substrate, a metallic catalyst of the mixture of residual iron, tin and indium is obtained. It was found that this 3-component type catalyst composed of Fe.Sn.In also acts as the catalyst for manufacturing CNC.

In a case where a pure metal or an organic-metallic compound is used as a raw material, since the metals contained in the raw materials are not oxidized by calcination in an inactive gas, a mixed catalyst of pure metals is produced. However, in a case of calcination in the air, the metals are finally oxidized, then a mixed catalyst of metallic-oxides is obtained. As described above, both of the mixed catalyst of pure metals and the mixed catalyst of metallic-oxides act as the catalyst for manufacturing carbon substances such as CNC, CNT or CNP.

In order to pile up metal films in layers, various well-known methods may be used, such as a vacuum evaporation method, a spattering method, an ion-plating method, a chemical vapor deposition (CVD) method, an electric plating method, an electroless plating method, etc.

Most simple method to form films is a paste painting method. In this method, first, a metallic paste containing metallic raw materials is made, next the paste is painted on a substrate by means of a screen-printing method. Finally, by calcinating the substrate to break down and to remove out unnecessary organic components, a metallic film or a metallic oxide film is thus produced.

In this paste method, metallic powders, metal-oxide powders and organic-metallic compound powders (organic-metallic complex powders are also included) are used as metallic raw materials, and these materials are mixed with resin and organic solvent in order to make the metallic paste with suitable viscosity. Subsequently, by painting the metallic paste on substrates and by calcinating them, metallic films or metallic oxide films are formed.

A 2-component type catalyst can be straightforwardly produced by calcinating a substrate painted with metallic paste which is mixed together with two metallic raw materials. However, even in the case where making two kinds of pastes for each metallic, and painting the two pastes to pile up in layers on a substrate, after that, by calcinating it, a 2-component type catalyst can be produced. These two methods or the modified methods can be applied to production of 3-component and multi (more than 3)-component type catalysts.

EMBODIMENTS

First Embodiment

Production of 2-Component Type Catalysts and Experiments of Synthesis of Carbon Substances In this embodiment, twelve kinds of 2-component type catalysts were produced on the surfaces of substrates, and next, carbon substances were formed on the surfaces of the twelve kinds of catalysts by means of a vapor phase growth method. Subsequently, the effect of the catalysts was evaluated by observing the grown carbon substances by an electron microscope.

The above-mentioned twelve kinds of the 2-component type catalysts comprises a first component (Fe, Co or Ni) and a second component (Sn or In), where the first component is pure a metallic powder or a metallic oxide powder, and the second component is also a pure metallic powder or a metallic oxide powder. For example, Co is a pure metallic powder, and $Fe_2O_3$ is a metallic oxide powder. The discrimination of a pure metal and a metallic oxide is shown in the catalyst symbol in the case of Fe.Co.Ni.

TABLE 1

Composition of 2-component type catalysts

| Fist component | Second component | Catalyst symbol |
| --- | --- | --- |
| Fe | Sn or $SnO_2$ | Fe•Sn |
| Fe | In or $In_2O_3$ | Fe•In |
| $Fe_2O_3$ | Sn or $SnO_2$ | $Fe_2O_3$•Sn |
| $Fe_2O_3$ | In or $In_2O_3$ | $Fe_2O_3$•In |
| Co | Sn or $SnO_2$ | Co•Sn |
| Co | In or $In_2O_3$ | Co•In |
| CoO | Sn or $SnO_2$ | CoO•Sn |
| CoO | In or $In_2O_3$ | CoO•In |
| Ni | Sn or $SnO_2$ | Ni•Sn |
| Ni | In or $In_2O_3$ | Ni•In |
| NiO | Sn or $SnO_2$ | NiO•Sn |
| NiO | In or $In_2O_3$ | NiO•In |

By dispersing the mixed powders of the first component and the second component in an organic solvent, further to which some amount of resin was added, then a metallic paste with suitable viscosity was made. The component ratio of the metallic paste was arranged so that the first component:the second component:the resin:the organic solvent=1:1:1:6 (weight ratio).

The metallic paste thus made was painted on an alumina substrate to make a 0.5 mm thick film, and was desiccated at a temperature 150° C. for one hour. Subsequently the metallic paste was calcinated in the air at a temperature 580° C. for three hours. By this calcination, unnecessary organic substances was removed, a thin film of the mixed composition of the first component and the second component was formed. This thin film composition is the 2-component type catalyst related to the present invention.

The next experiment was to grow carbon substances on the surfaces of the twelve kinds of the substrates. FIG. 1 is a schematic structural diagram of the carbon nanocoil manufacturing apparatus of the present invention. This manufacturing apparatus 2 is a flow reactor placed under atmospheric pressure, a reaction chamber 4 is surrounded by a quartz tube 6 which has a diameter of 130 mm and a length of 150 mm.

A tube-form heater 8 having a length of 1100 mm is installed around the outer circumference of the central portion of the quartz tube 6, and the center of the reaction chamber 4 is set in an isothermic region 10 over a length of approximately 200 mm. A quartz boat 14 is disposed in this isothermic region 10; and on the upper surface of the quartz, a growth substrate 12 is disposed. This catalyst substrate 12 comprises an almina substrate 16 and a catalyst layer 18 that is formed in a form of a thin film on the surface of the almina substrate 16.

First, the interior of the quartz tube 6 is filled with helium gas, and the temperature of the growth substrate is raised to 700° C. at a temperature rising rate of 15° C. per minute. This helium gas is introduced in order to prevent the metal from being oxidized inside the reaction chamber. After the temperature reached at 700° C., a part of the helium gas is replaced with acetylene, and the mixed gas of a flow rate 5.0 SLM of helium and a flow rate 1.5 SLM of acetylene is flowed for 30 minutes.

The acetylene is pyrolyzed on the surface of the catalyst substrate 12, and a carbon component grows as a carbon substance 20 by catalysis. In FIG. 1, CNC is shown as the carbon substance 20. After the reaction time 30 minutes, the acetylene is cut off, so that only helium is caused to flow, and the catalyst substrate is gradually cooled to room temperature in this helium atmosphere.

Though acetylene was used as the gas for manufacturing the carbon substance, various gases may be available such as not only methane, ethane, but also alkane, alkene, alkine, aromatic hydrocarbon, etc. In particular, acetylene, allylene, benzene, etc. are valid, and among them, acetylene is especially suitable.

As for heating temperature, a temperature higher than the catalytic decomposition temperature of hydrocarbon is effective. Though the pyrolysis temperature of acetylene is approximately 400° C., the suitable temperature for synthesis of carbon nanocoils is approximately 600-800° C. However, the synthesis temperature is not necessarily limited in the region but can be freely set according to a production rate, provided that the temperature being higher than the catalytic decomposition temperature of hydrocarbon.

The catalyst substrate 12 taken out from the reaction chamber was observed by a scanning type electron microscope (JSM-T20, made by Nihon Densi Co.). The magnification rate of the electron microscope always was 10,000 in all the observations. Since the carbon substances produced by the present invention are of nanosize (nanocarbon substance), a 1000 nm scale is shown in Figures for comparison. Since the results of the observations of Fe.Sn and Fe.In are almost same as the results of $Fe_2O_3$.Sn and $Fe_2O_3$.In, the microscope images are omitted.

Figure 2:
FIG. 2 is an electron microscope image of carbon substances grown by the catalyst $Fe_2O_3.Sn$.
Figure 3:
FIG. 3 is an electron microscope image of carbon substances grown by the catalyst $Fe_2O_3.In$.
Figure 4:
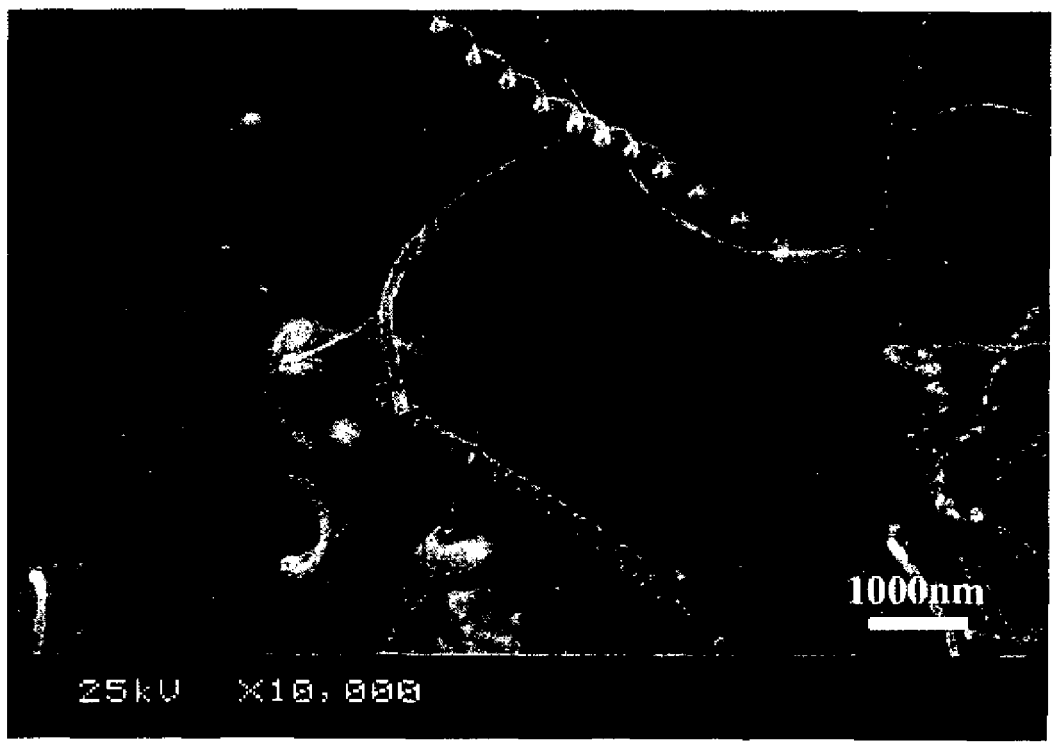
FIG. 4 is an electron microscope image of carbon substances grown by the catalyst Co.Sn.
Figure 5:
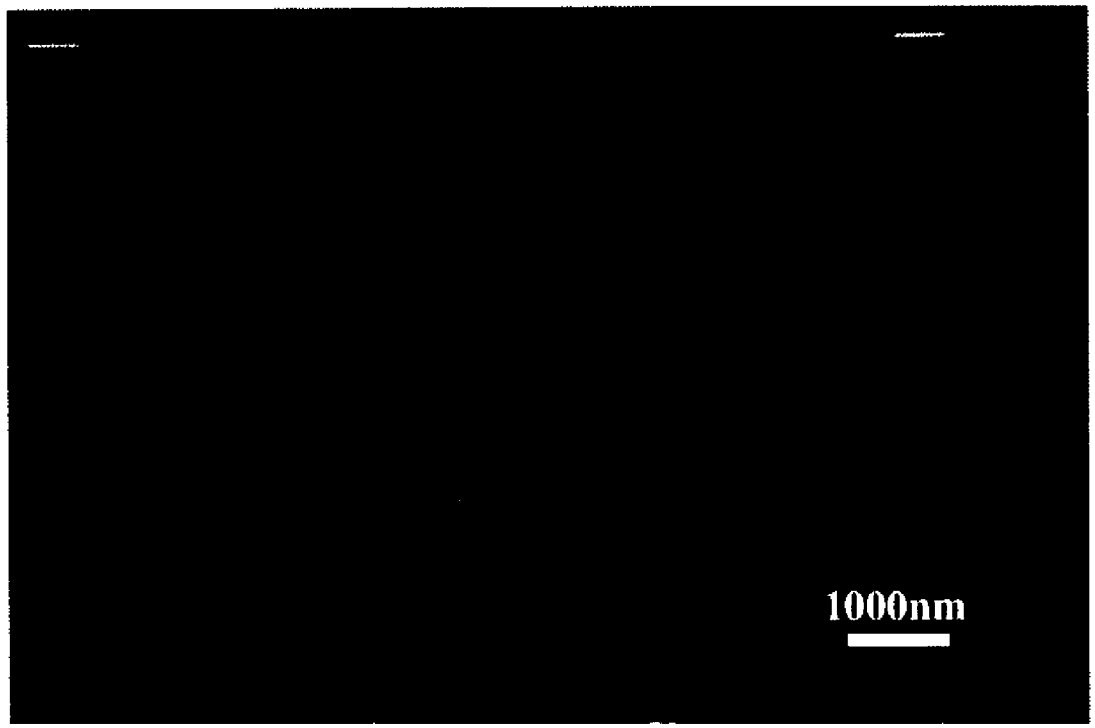
Figure 6:
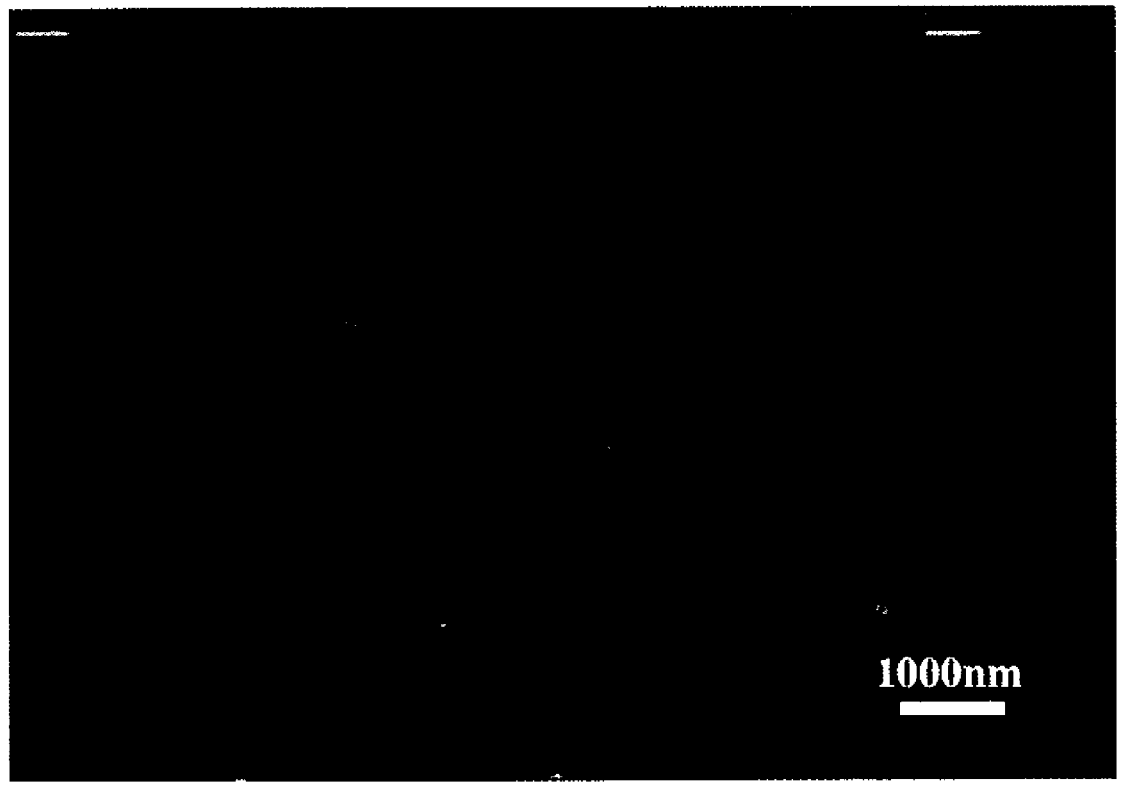
FIG. 6 is an electron microscope image of carbon substances grown by the catalyst CoO.Sn.
Figure 7:
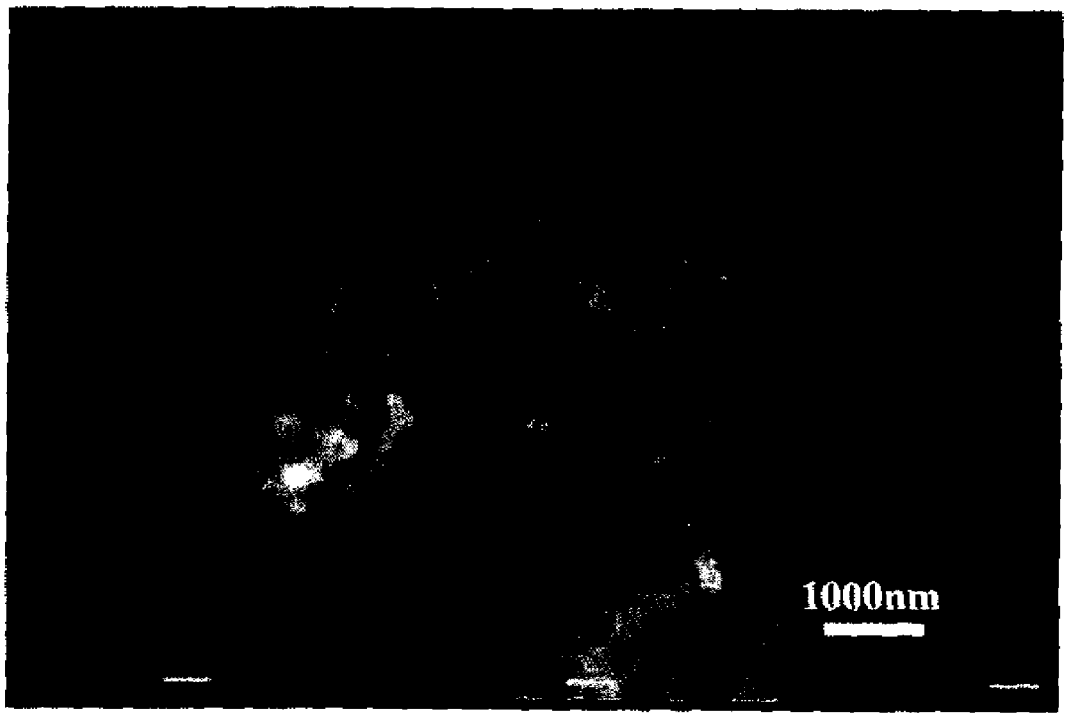
Figure 8:
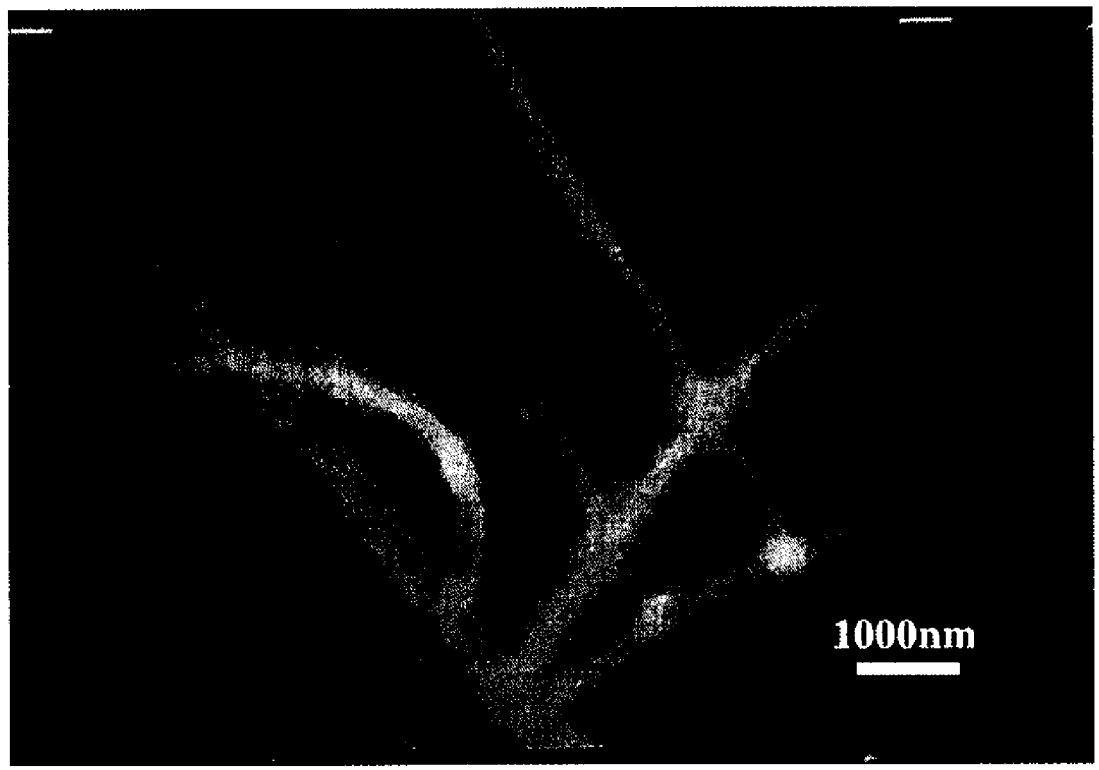
FIG. 8 is an electron microscope image of carbon substances grown by the catalyst Ni.Sn.
Figure 9:
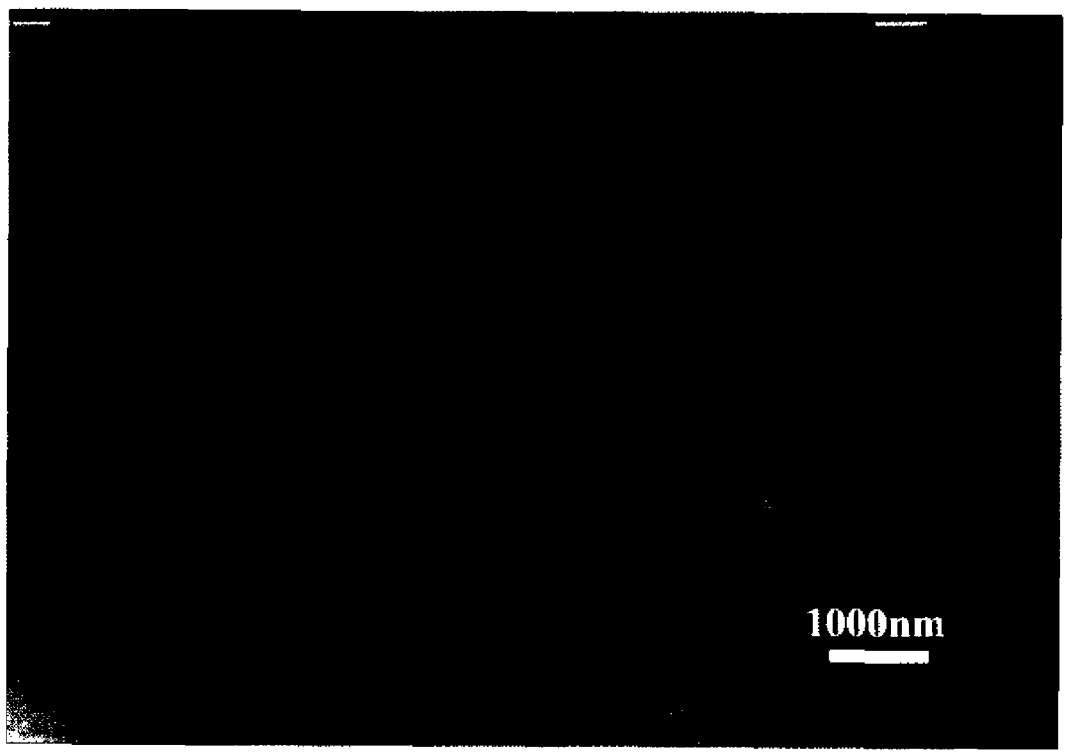
Figure 10:
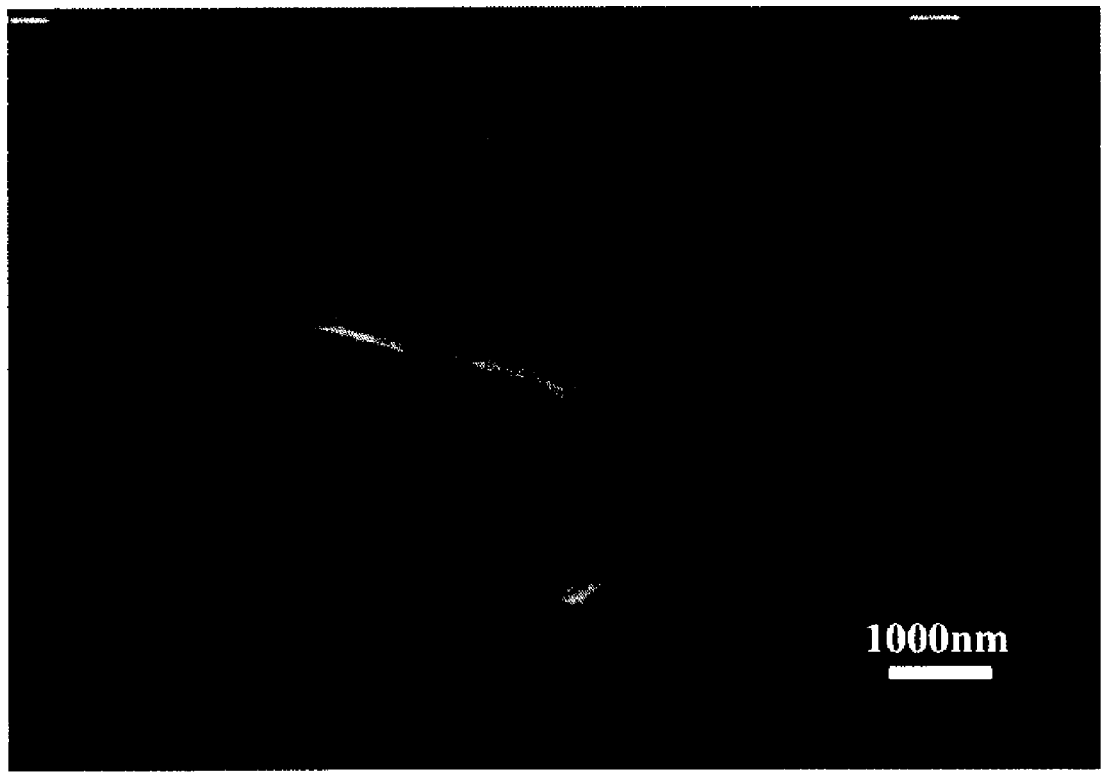
FIG. 10 is an electron microscope image of carbon substances grown by the catalyst NiO.Sn.
Figure 11:
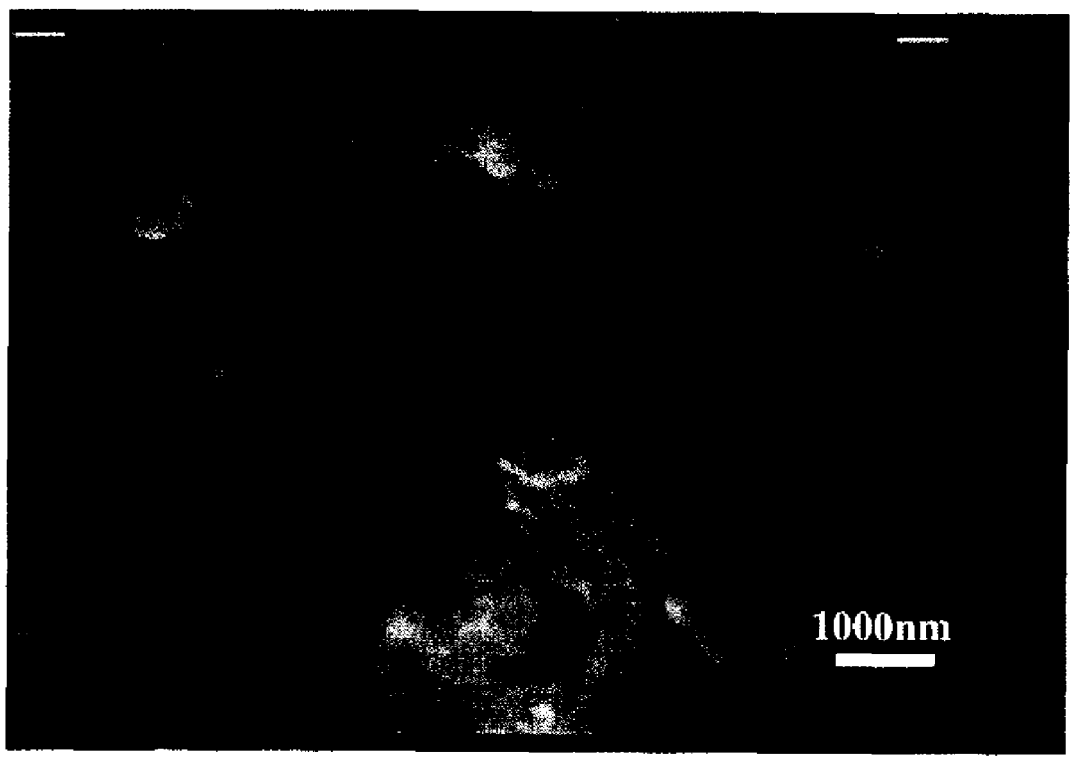

FIGS. 2 through 11 show the images of the carbon substances observed by the magnification 10,000 electron microscope and each one of the Figures is accompanied by a 1000 nm scale. FIG. 2 shows the image of the carbon substances by the catalyst $Fe_2O_3$.Sn; FIG. 3, by the catalyst $Fe_2O_3$.In; FIG. 4, by the catalyst Co.Sn; FIG. 5, by the catalyst Co.In; FIG. 6, by the catalyst CoO.Sn; FIG. 7, by the catalyst CoO.In; FIG. 8, by the catalyst Ni.Sn; FIG. 9, by the catalyst Ni.In; FIG. 10, by the catalyst NiO.Sn; and FIG. 11, by the catalyst NiO.In, respectively.

As seen from these electron microscope images, CNC (large) and CNT were mainly produced by the catalyst Fe.Sn; CNP, by the catalyst Fe.In; CNC (large) and CNT, by the catalyst $Fe_2O_3$.Sn; CNP, by the catalyst $Fe_2O_3$.In; CNC (small) and CNT, by the catalyst Co.Sn; CNT, by catalyst Co.In; CNC (large) and CNT, by the catalyst CoO.Sn; CNT, by CoO.In; CNT, by the catalyst Ni.Sn; CNC and CNT, by the catalyst Ni.In; CNT, by the catalyst NiO.Sn; CNT and CNT, by the catalyst NiO.In, respectively. These results are summarized in Table 2.

TABLE 2

| 2-component type catalysts and carbon substances | |
|---|---|
| Catalyst symbol | Produced carbon substance |
| Fe•Sn | CNC (large) + CNT |
| Fe•In | CNP |
| $Fe_2O_3$•Sn | CNC (large) + CNT |
| $Fe_2O_3$•In | CNP |
| Co•Sn | CNC (small) + CNT |
| Co•In | CNT |
| CoO•Sn | CNC (large) + CNT |
| CoO•In | CNT |
| Ni•Sn | CNT |
| Ni•In | CNC + CNT |
| NiO•Sn | CNT |
| NiO•In | CNC + CNT |

As seen from Table 2, the catalyst for manufacturing CNC are Fe.Sn, $Fe_2O_3$.Sn, Co.Sn, CoO.Sn, Ni.In and NiO.In, and as the 2-component type catalysts, there exist three groups of Fe.Sn, Co.Sn and Ni.In. At the present stage, CNC and CNT grow together in a mixing state, and 100% yield of CNC alone is difficult. It is necessary in future to research and develop the 100% production method and the isolation method of CNC from CNT.

On the other hand, since CNP grows up by Fe.In and $Fe_2O_3$.In at the yield rate of 100%, the group of Fe.In becomes the catalyst for manufacturing CNP. Beside, since CNT grows up by Co.In, CoO.In, Ni.Sn, NiO.Sn at the yield rate of 100%, the two groups of Co.In and Ni.Sn can be the catalyst for manufacturing CNT.

Figure 12:
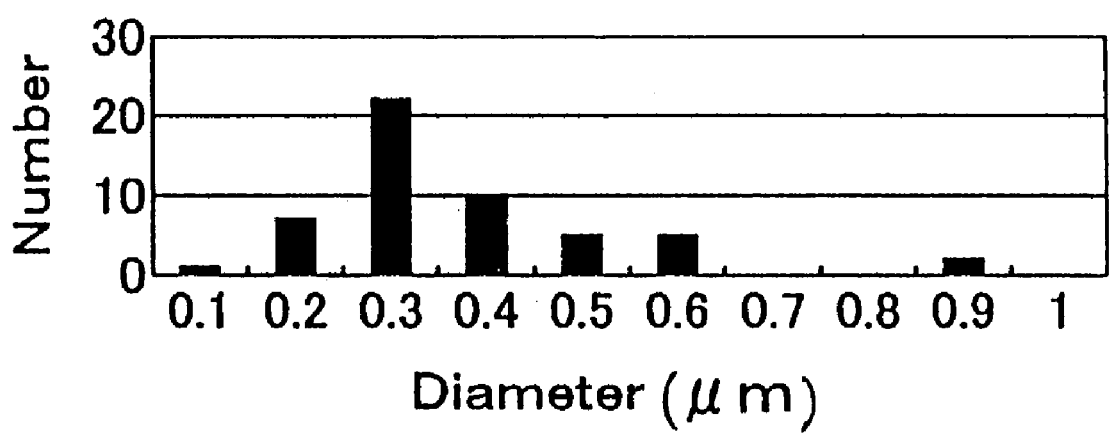
FIG. 12 is a distribution graph of the external diameter of carbon nanocoils grown by the catalyst CoO.Sn.

FIG. 12 is a graph showing different external diameters of carbon nanocoils which grow by the catalyst CoO.Sn. The external diameters differ in a range of 0.1-0.9 μm, i.e., 100-900 nm and the maximum frequency value is 0.3 μm, i.e., 300 nm.

Figure 13:
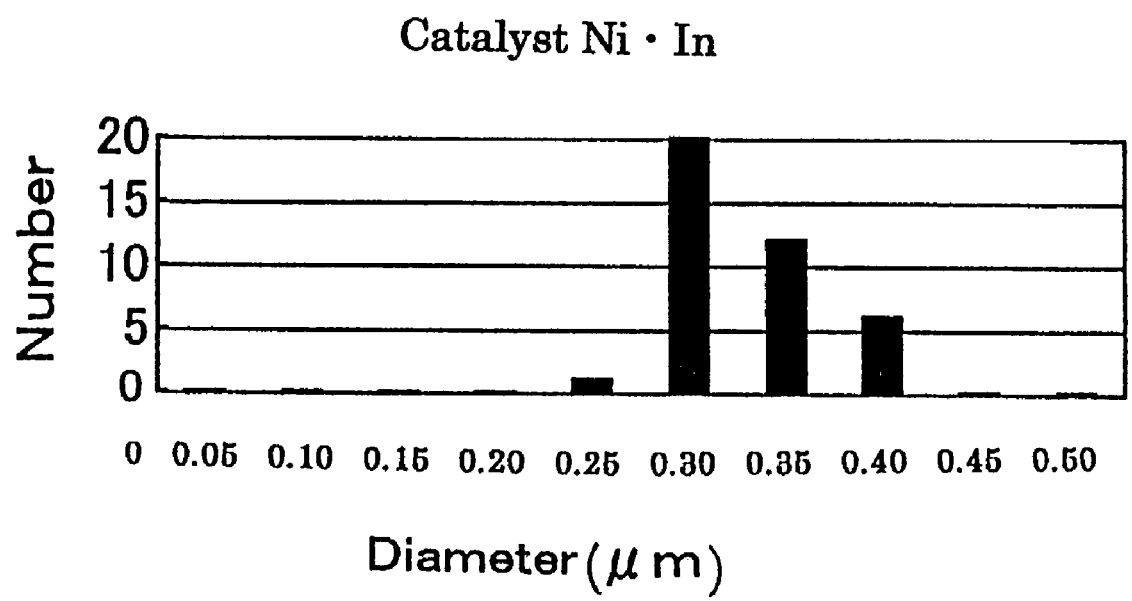

FIG. 13 is a graph showing different external diameters of carbon nanocoils which grow by the catalyst Ni.n. The external diameters differ in a range of 0.25-0.40 μm, i.e., 250-400 nm and the maximum frequency value is 0.30 μm, i.e., 300 nm.

Second Embodiment

Production of 3-Component Type Catalysts and Experiments of Synthesis of Carbon Substances In this second embodiment, six kinds of 3-component type catalysts were produced on the surface of substrates. Next, carbon substances were formed on the surfaces of the six kinds of these catalysts. Then, the grown carbon substances were observed by an electron microscope in order to evaluate the effect of the catalysts.

The above-mentioned six kinds of 3-component type catalysts comprise a first component, a second component and a third component. An IOT substrate is used as the second component and the third component, where the IOT is an abbreviation of Indium-Tin-Oxide and is the mixed catalyst of $In_2O_3$ and $SnO_2$. Namely, the second component is $In_2O_3$ and the third component is $SnO_2$, so that both of In and Sn are contained in the ITO.

The first component is a pure metallic powder or a metallic-oxide powder. Metallic paste containing the first component was painted on the ITO substrate. Afterward, by calcinating the substrate, the 3-component type catalyst of the first component thin film was formed on the ITO substrate. Since the paste treatment method and the calcination method are same as those of the first embodiment, the detail explanation will be omitted. The catalysts are shown in Table 3.

TABLE 3

Compositions of 3-component type catalysts.

| First component | Second•third components | Catalyst symbols |
|---|---|---|
| Fe | ITO | Fe•ITO |
| $Fe_2O_3$ | ITO | $Fe_2O_3$•ITO |
| Co | ITO | Co•ITO |
| CoO | ITO | CoO•ITO |
| Ni | ITO | Ni•ITO |
| NiO | ITO | NiO•ITO |

Next, these 3-component type catalysts are disposed in a reaction chamber, and carbon substances was grown on the surface of the catalysts by means of the same method as the first embodiment. Then, the growing manner of nanocoils was observed by imaging the catalyst surfaces by the scanning type electron microscope.

Figure 14:
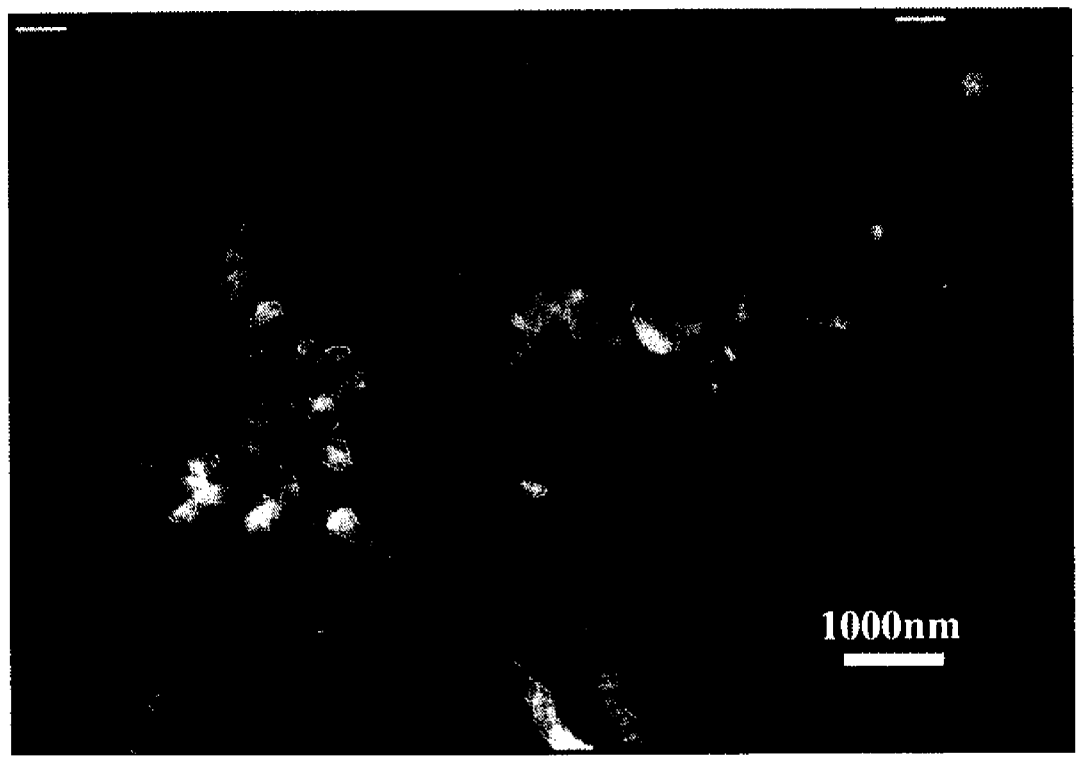
FIG. 14 is an electron microscope image of carbon substances grown by the catalyst $Fe_2O_3$.ITO.
Figure 15:
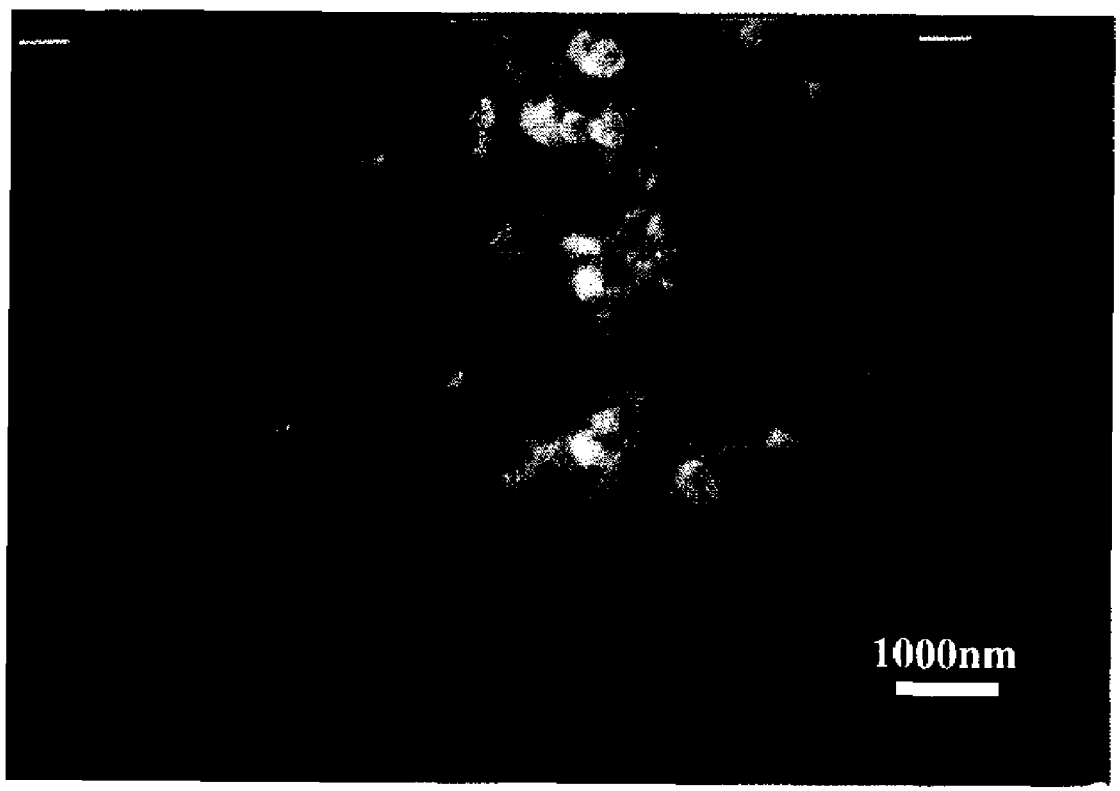
FIG. 15 is an electron microscope image of carbon substances grown by the catalyst Co.ITO.
Figure 16:
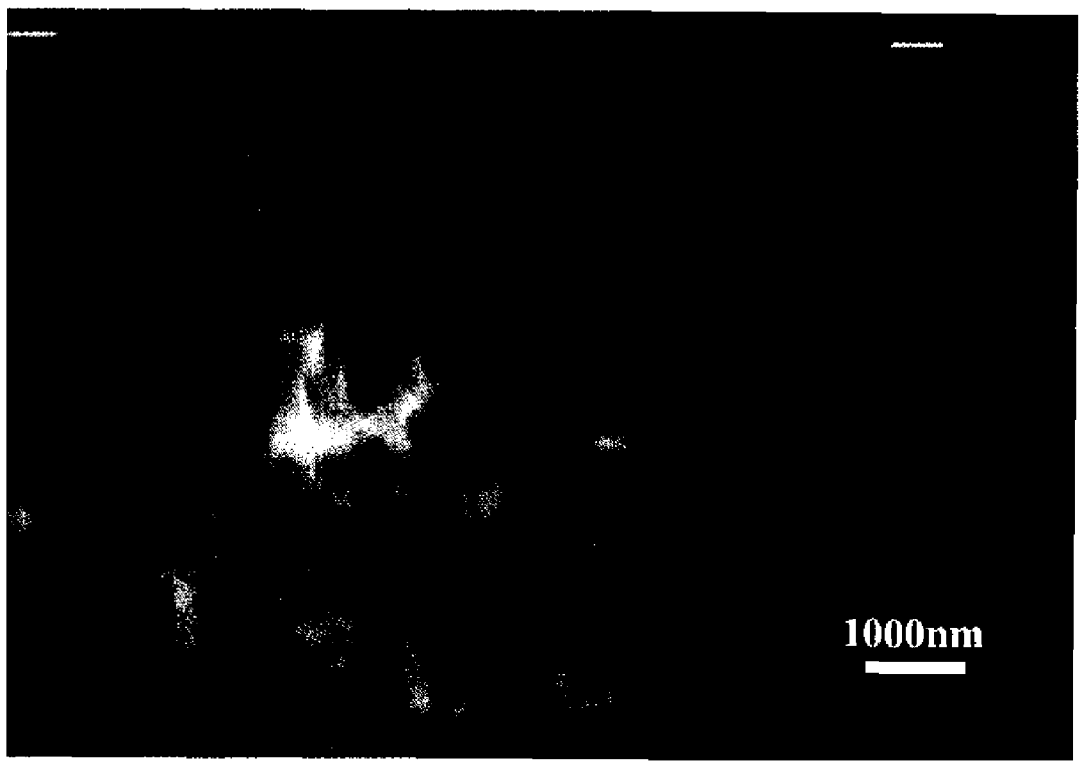
FIG. 16 is an electron microscope image of carbon substances grown by the catalyst NiO.ITO.

The respective images of the electron microscope are shown in Figures; and the case of the catalyst $Fe_2O_3$.ITO is shown in FIG. 14, the case of the catalyst Co.ITO in FIG. 15, the case of the catalyst NiO.ITO in FIG. 16. The electron microscope images for Fe.ITO, CoO.ITO and Ni.ITO are almost same as those in FIGS. 14, 15 and 16, respectively, and these Figures are omitted. The magnifications of all observations are set at 10,000 times, and the 1000 nm scale is shown in each one of Figures.

As shown in FIGS. 14-16, a large quantity of CNC was observed on all surfaces of the 3-component type catalysts, but only a small quantity of CNT was seen. The external diameter of observed carbon coils are less than 1000 nm, and all of these carbon coils are regarded as carbon nanocoil. The results are shown in Table 4 below.

As seen from Table 4, it seems that the 3-component type catalysts give more yield of CNC than the 2-component type catalysts. However, it cannot be concluded at present that the 3-component type catalysts are more effective than the 2-component type catalysts.

TABLE 4

3-component type catalysts and carbon substances

| Catalyst symbol | Produced carbon substance |
|---|---|
| Fe•ITO | CNC (large) + CNT |
| $Fe_2O_3$•ITO | CNC (large) + CNT |
| Co•ITO | CNC (large) + CNT |
| CoO•ITO | CNC (large) + CNT |
| Ni•ITO | CNC (large) + CNT |
| NiO•ITO | CNC (large) + CNT |

The present invention is not limited to the embodiments described above. Various modifications and design alternations, etc. that involve no departure from the technical concept of the present invention are also included in the technical scope of the present invention.

As seen from the above, according to the present invention, by selecting one of iron, cobalt and nickel of a first element group and one of tin and indium of a second element group, the catalyst for manufacturing carbon substances includes is formed with at least the selected first element and the selected second element. Accordingly, carbon substances of CNC, CNT, CNP, etc. can be effectively produced.

The present invention, the catalyst for manufacturing carbon substances comprises at least iron and tin or cobalt and tin. Accordingly, CNC can be effectively produced as a carbon substance.

In the present invention, the catalyst for manufacturing carbon substances comprises at least nickel and indium. Accordingly, CNC can be effectively produced as a carbon substance.

In the present invention, the catalyst for manufacturing carbon substances comprises at least cobalt, tin and indium or nickel, tin and indium. Accordingly, CNC or CNT can be produced as a carbon substance.

In the present invention, since iron, cobalt or nickel is employed in oxide-states or in the form of iron-oxide, cobalt-oxide, or nickel-oxide, respectively, when producing catalysts for manufacturing carbon substances, these catalysts are not oxidized any more when used in the air, so that stable catalysts for manufacturing carbon substances are provided.

Furthermore, in the present invention, since the 3-component type catalysts comprise cobalt.ITO or nickel.ITO, CNC can be selectively manufactured with a high efficiency.

The invention claimed is:

1. A catalyst for manufacturing nano-carbon substances, characterized in that said catalyst consists of a first component and a second component, wherein said first component is selected from the group consisting of CoO and NiO, and said second component is selected from the group consisting of Sn, In and $In_2O_3$.

* * * * *